Feb. 11, 1969  L. K. LAGUERRE  3,426,396
PROFILED STRIP SLIDE FASTENER
Filed Feb. 26, 1968

INVENTOR
LEON K. LAGUERRE
by Hall, Pollock & VandeSande
HIS ATTORNEYS

United States Patent Office 3,426,396
Patented Feb. 11, 1969

3,426,396
PROFILED STRIP SLIDE FASTENER
Leon Ker Laguerre, 10 Rue Lemoine,
Boulogne-sur-Seine, France
Filed Feb. 26, 1968, Ser. No. 708,142
Claims priority, application France, Mar. 7, 1967,
97,720
U.S. Cl. 24—201
Int. Cl. A44b 19/24
8 Claims

ABSTRACT OF THE DISCLOSURE

A slide for fasteners of satchels formed of complementary profiled fastener strips and comprising a small plate having two convergent lateral walls and a central partition therebetween; the said slide is made of a sufficiently flexible material so as to be engageable by resilient deformation by the upper edge of the strips, perpendicularly to their longitudinal direction, the lower faces of said flanges being inclined toward the opening provided between those walls, so as to facilitate this engagement.

---

The present invention relates to a slide for the fasteners of satchels, bags or shopping or tool bags of the type formed by two flexible strips having complementary ribs and interlocking by resilient deformation under the action of a slide formed by a small plate having two convergent lateral walls and, in the widest part of the space confined by the said walls, a central partition forming a spacing element for the strips for opening them. The lower edges of the lateral walls and possibly the central partition of the slide are generally provided with flanges engaging over shoulders provided on the profiled strips for preventing the slide from being detached from the fastener and for guiding it during its sliding on the fastener.

A process is also known for the continuous manufacture of satchels provided with a fastener of the kind in which the fastener strips are placed between the edges of a folded sheet of thin plastics material intended to form the satchel, the whole being guided between the electrodes of a welding machine, which effects intermittent welding of the said strips to the edges of the sheet, each time on a length corresponding to the width of a bag, whereupon the folded sheet with the fastener welded to its edges is subjected at regular intervals to transverse welding and cutting operations for forming the lateral edges of the satchels. To be able to engage a slide on the said fastener strips thus fixed to the edges of the satchel, it is necessary to arrest the transverse welds below the lower edge of the profiled strips, then to engage the slide by one end of these profiled strips and to secure the ends of the two strips either by means of a second welding operation, or more generally by means of staples, which increases the time necessary for the manufacture of the satchel.

The present invention relates to a slide, whereby this supplementary operation may be obviated; it relates more particularly, although not exclusively to a slide sliding astride the fastener formed by the two profiled strips, that is to say, the plate of the slide is perpendicular to the central plane of the fastener. This slide is characterised in that it is made of a sufficiently flexible material, preferably of mouled plastics material, so as to be engaged by resilient deformation by the upper edge of the fastener strips, perpendicularly to their longitudinal direction, the lower faces of the said flanges or noses being preferably inclined towards the openings provided between these walls, so as to facilitate this engagement.

The invention also relates to a process and device for the fitting of the slides on the fasteners during continuous manufacture of the satchels.

By way of example, several embodiments of the slide according to the invention and also the device for the fitting of the slides are described and shown in the accompanying drawings.

Figure 1:
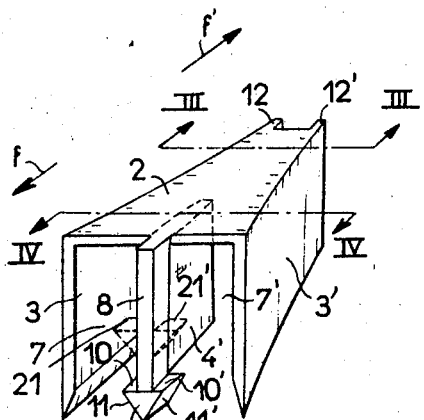
FIGURES 1 and 2 shows in perspective a first embodiment of the slide, viewed respectively from its two opposite ends.

The slide shown in FIGURE 1 to 4 and which is intended to slide astride the fastener formed by profiled strips 1, 1' (FIGURES 3 and 4) consists in the usual manner of a small plate 2, resting on the upper edge of the profiled strips, and carrying two lateral divergent walls 3, 3', as well as a central partition 4 extending over part of the length of the slide, and the purpose of which is to space the strips apart, causing them to open when the slide is moved in the direction of the arrow f', while movement in the direction of the arrow f produces reclamping of the strips in the narrow part of the slide and their interlocking by resilient deformation. To prevent the slide from leaving the fastener and to ensure satisfactory guiding during its sliding, the lower edges of the lateral walls 3, 3' and possibly the central partition 4 generally have flanges or noses engaging over shoulders 5, 5' or 6, 6' of the strips 1, 1', which during assemblage necessitates engaging the slide from one end, kept open, of the satchel.

Figure 2:
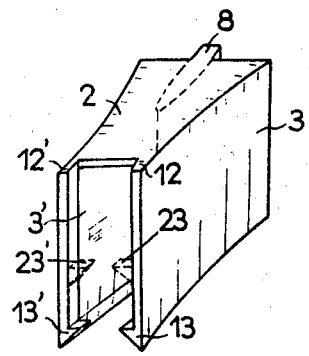
Figure 4:
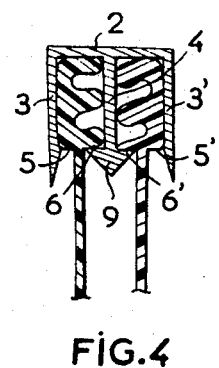
FIGURES 3 and 4 shows in cross-section respectively on III—III and IV—IV of FIGURE 1 the slide engaged on the fastener strips.
Figure 3:
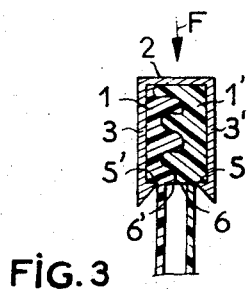

According to the invention, the slide is made of a material which is sufficiently flexible, preferably of moulded plastics material, to be engaged by resilient deformation no longer longitudinally by one end of the fastener, but transversely in the direction of the arrow F of FIGURES 3 and 4. In addition, to facilitate this engagement by resilient spacing apart of the lateral walls 3, 3' of the slide, the flanges or noses provided on these walls and/or on the central partition have their lower faces inclined towards the interior of recesses 7, 7' provided between the central partition 4 and the lateral walls 3, 3' for facilitating entry of the strips 1, 1' in the said recesses. As shown in FIGURES 1 to 4, the central partition 4 has at the widest end of the slide a projecting rib 8 (FIGURES 1 to 4) carrying on its lower edge a double nose of triangular section 9 having two upper faces 10, 10' perpendicular to the partition 4 and engaging under the shoulders 6, 6' of the strips 1, 1', and two inclined lower faces 11, 11', while at the narrow end of the slide, the lateral walls have two projecting ribs 12, 12', the lower edges of which (FIGURES 2 and 3) have single triangular noses 13, 13' engaging under the shoulders 5, 5' of the strips 1, 1'. On the contrary, throughout their length, the lower edges of the lateral walls 3, 3' are chamfered to facilitate their engagement on the fastener 1, 1'.

Location of hooking and guiding noses outside the actual slide, on ribs projecting at its ends, offers considerable facilities for the moulding of the slides.

It should be noted that the nose 9 of the central partition and the noses 13, 13' of the lateral walls are not necessarily provided on the lower edges of these walls; they may in fact be provided by forming projecting ribs 21, 21' and 23, 23' at any height on the inner faces of the lateral walls and on the two faces of the central partition according to the height and form of the profiled fastener strips 1, 1', as indicated in dotted lines in FIGURES 1 and 2.

It should also be noted that the upper face of the hooking and guiding noses is not necessarily perpendicular to the longitudinal plane of symmetry of the slide; in particular, these faces may be inclined inwardly and upwardly, which in certain cases may ensure better support of the strips, or they may have on their free edge an upwardly projecting flange engaging in a longitudinal groove provided for this purpose on the shoulders 6, 6' of the profiled strips.

Figure 5:
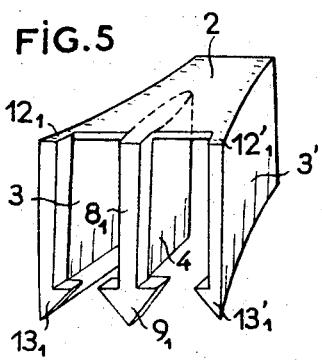
FIGURE 5 and 6 show in perspective two other embodiments of the slide viewed from the widest end of the latter.
Figure 6:
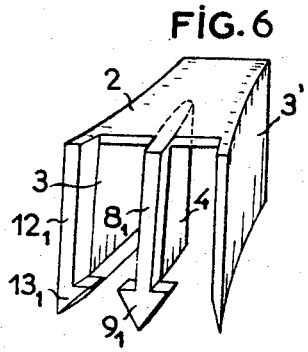

According to the modification shown in FIGURE 5, the three noses $9_1$, $9_1'$ and $13_1$, $13_1'$ are all arranged at the widest end of the slide, while according to the modification shown in FIGURE 6 and intended to co-operate with a fastener, the strips of which have an unsymmetrical profile in cross-section, a nose $13_1$ is provided on only one of the lateral walls 3 and a double triangular nose $9_1$ on the central partition 4. In this case, noses could also be provided on both lateral walls and a single nose on the central partition. Instead of comprising a nose, the central partition may have a tapered inner edge.

As mentioned above, the invention also concerns a process of fitting the slides, which consists in fixing these slides on the fastener strips during continuous manufacture of satchels on the passage of the folded plastics material sheet provided with welded-on profile strips, preferably between the longitudinal welding electrodes ensuring fixing of the fastener strips to the folded sheet, and the transverse cutting and welding electrode forming the lateral edges of the satchels, this fitting of the slides taking place during the stoppage, in the course of which welding of the satchel takes place, or during operation if the strips are welded continuously to the bag instead of intermittently.

Figure 8:
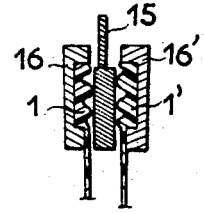
FIGURES 8 and 9 are cross-sections respectively on VIII—VIII and IX—IX of FIGURE 7.
Figure 7:
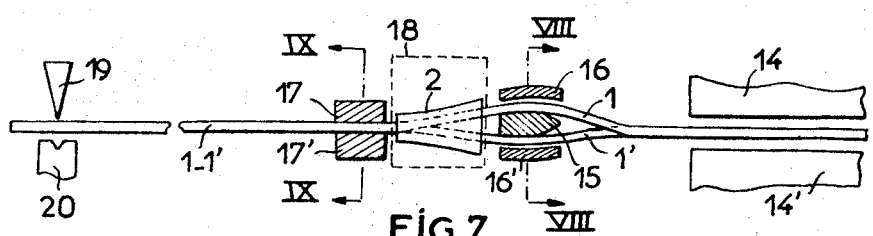
FIGURE 7 represents in horizontal section the device for fitting the slides in the course of manufacture of the satchels.
Figure 9:
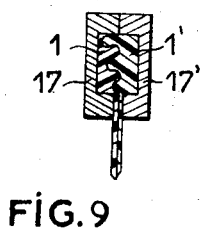

FIGURES 7 to 9 show a device for carrying out this process. The folded sheet provided with fastener strips 1, 1', which are welded to this sheet by means of the electrodes 14, 14', functioning intermittently on each advance of the sheet by a length equal to the width of the satchel, passes on either side of a spacing element 15, preferably having an elongated and rounded form, causing opening of the strips previously welded to the sheet by the electrodes 14, 14' in the closed position. Arranged on either side of the spacer 15 are guiding elements 16, 16' formed for example of channel sections (FIGURE 8) facing each other and forming passages in which the strips 1, 1' are guided without being gripped. However, in certain cases, locking of this device at the moment of fitting the slide may be provided.

Furthermore, in the case where the strips are welded to the sheet forming the satchel without being interlocked, as shown in the drawing, on leaving the electrodes 14, 14', the device 15, 16 will merely have to act as guide, and the shape of the parts 15, 16, 16' may be slightly modified in consequence, since the part 15 will no longer have to act as spacer.

Following the spacing and guiding device 15, 16, 16' and at a short distance from the latter are two movable clamping and guiding parts 17, 17', also of channel section for example, forming a recess in which the two strips 1, 1' are clamped in the closed position and are prevented, possibly by suitable locking means, from displacement during the engagement of the slide, which despite its resilient deformation, may exert a considerable force on them.

The slides 2 are engaged on the fastener between the spacer 15 and the clamping device 17, 17' either manually or preferably by means of an automatic device, comprising a charger 18, shown in dotted lines and provided with a pusher engaging the successive slides on the fastener 1, 1' firmly held between the guiding and clamping device. The clamping pieces 17, 17' open intermittently to permit the folded sheet provided with fastener strips and slide to advance towards the transverse welding and cutting electrodes 19, 20; this movement of the clamping pieces 17, 17', as well as that of the pusher of the loader may be synchronised with the control of the electrodes 14, 14'. Closure of the clamping pieces 17, 17' may also take place immediately after the passage of the slide, so as to re-close the profiled fastener immediately after the slide and ensure register of the two profiled strips at the crossing of the transverse welding, any blocking of these parts taking place only at the moment of the introduction of the slide, as for the guide pieces 16, 16'. Furthermore, if fitting of the slides is to be effected during operation, without intermittent stoppage of the strips for carrying out welding of the said strips to the sheet of plastics material forming the satchel, the parts 17, 17' will not be blocked and will ensure just sufficient clamping for guiding and supporting the profiled strips 1, 1' during the engagement of the slide without impeding their continuous advance movement.

What I claim is:

1. Slide for sliding fasteners, more particularly for satchels, bags, covers or shopping or tool bags, formed by flexible, profiled strips, each having complementary ribs and grooves and at least one shoulder below their ribbed part, the said slide adapted to slide astride on the fastener, comprising a plate carrying two divergent lateral walls and a central partition extending over part of the length of the slide in its widest zone, supporting and guiding means being provided on the said slide for engaging under the said shoulders of the fastener strips, and at least the lateral walls of the slide being dimensioned and constructed of a sufficiently flexible material for permitting the engagement of the slide by resilient deformation by the upper edge of the fastener strips perpendicularly to their longitudinal direction, and means engaging below the shoulders of the said strips having a lower face chamfered for facilitating the said engagement.

2. Slide for sliding fasteners, more particularly for satchels, bags, covers or shopping or tool bags, formed by flexible profiled strips, each having complementary ribs and grooves and at least one shoulder below their ribbed part, the said slide adapted to slide astride on the fastener, being formed of moulded plastic and comprising a plate carrying two divergent lateral walls and a central partition extending over part of the length of the slide in its widest zone, supporting and guiding noses provided at a suitable height on certain of the said walls and partition for engaging under the shoulders of the said strips, the material forming the slide being sufficiently flexible to permit the engagement of the slide and locking of the said noses under the said shoulders by resilient deformation by the upper edge of the fastener strips perpendicularly to their longitudinal direction, the said noses having a chamfered lower face to facilitate the said engagement.

3. Slide according to claim 2, in which the said noses are formed by ribs of triangular cross-section, their upper face being plane and perpendicular to the wall on which they are provided.

4. Slide according to claim 2, in which the said noses are formed by ribs of triangular cross-section, the upper face of which is inclined upwardly from the wall on which this rib is provided.

5. Slide according to claim 2, in which the noses engaging below the shoulders of the profiled strips have on their edge an upwardly projecting flange, while a longitudinal groove is provided in the shoulder of the corresponding profiled strip for engaging with the said flange.

6. Slide according to claim 2 in which the central partition has on the lower edge of its end corresponding to the widest part of the slide a double nose of triangular section extending on either side of the said partition.

7. Slide according to claim 2, in which the internal faces of the two lateral walls have a nose of triangular section on the lower edge of one at least of their ends.

8. Slide according to claim 2, in which the chamfered noses are provided on the lower end of ribs extending the lateral walls and the central partition beyond the plate carrying them.

References Cited

UNITED STATES PATENTS

| 1,666,110 | 4/1928 | Statham | 24—205.12 |
|---|---|---|---|
| 3,220,076 | 11/1965 | Ausnit. | |
| 3,324,520 | 6/1967 | Ausnit. | |

BERNARD A. GELAK, *Primary Examiner.*

U.S. Cl. X.R.

24—205.12